A. C. ESTABROOK.

Improvement in the Manufacture of Molded Articles from Plastic Materials.

No. 123,254.                                                  Patented Jan. 30, 1872.

123,254

UNITED STATES PATENT OFFICE.

ALANSON C. ESTABROOK, OF NORTHAMPTON, MASSACHUSETTS, ASSIGNOR TO "FLORENCE MANUFACTURING COMPANY," OF SAME PLACE.

IMPROVEMENT IN THE MANUFACTURE OF MOLDED ARTICLES FROM PLASTIC MATERIALS.

Specification forming part of Letters Patent No. 123,254, dated January 30, 1872.

*To all whom it may concern:*

Be it known that I, ALANSON C. ESTABROOK, of Northampton, in the county of Hampshire and State of Massachusetts, have invented certain new and useful Improvements in Molds or Blocks for Molding Holes in Plastic Material used for ornaments, by which they may be fastened or united to any desired material; and that the following is a full, clear, and exact description of the same, reference being had to the accompanying drawing making a part of this specification, in which—

Figure 1:
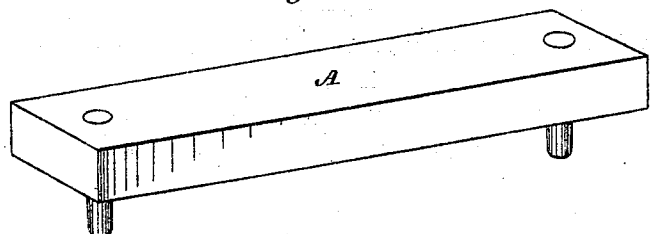
Figure 2:
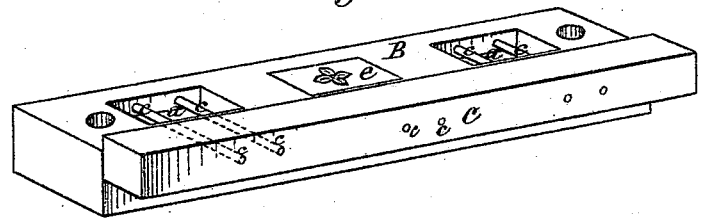
Figure 3:
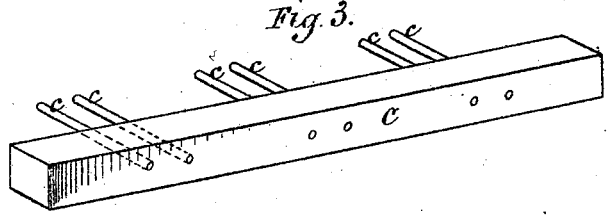
Figure 4:
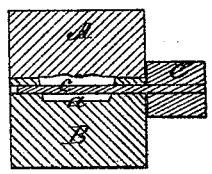

Figure 1 represents, in perspective, the top, and Fig. 2 the bottom of the molds or blocks. Fig. 3 represents, in perspective, the pin-bar, which constitutes the third member of the molds, when ready for use. Fig. 4 represents a transverse section through the mold or blocks when put together.

In the manufacture of ornaments and such other articles out of a composition rendered plastic by suitable ingredients, as heretofore practiced, the holes for securing such ornaments or articles to the material they were to be used with were drilled in after the composition became set or hardened. This operation was not only tedious and expensive, but the articles were often broken or left rough about the edges, and the holes were not uniformly spaced.

My invention consists in the application of a third piece or member to the ordinary molds used for molding such plastic material into ornaments or articles of use, whereby in molding said articles the holes for securing them to other substance or material shall be molded into them while in the act of being formed in said molds.

To enable others skilled in the art to make and use my invention, I will proceed to describe the same with reference to the drawing.

A represents the top or cap of the mold, in the under face of which may be wrought or set the dies for forming the ornamentation upon the articles to be molded. B represents the bed or bottom portion of the mold, in which recesses *a a* are formed of the size and shape of the article to be molded. The top and bottom portions of the mold go and are held together by dowel-pins in one and holes in the other, in the usual well-known way. Through the bed B of the molds, and so as to cut horizontally through the cells or recesses *a a* therein, are bored any suitable number of holes, so as to receive a corresponding number of pins, *c c*, that are fastened in or to the piece or strip C, which constitutes the third piece or member of the molds, and which pins *c*, when withdrawn from the molds by the removal of the piece C, leave the openings or holes through the molded material, by which they may be secured to such other material as may be desired to be used with them. The pins *c c* in the strip C, and the corresponding holes in the bed B, serve as dowels for holding these two blocks or pieces together; and when the piece C is removed from the piece B the pins, being fastened to the piece C, are all withdrawn with said piece C.

When the bed piece B and strip C, with its pins, are put together, as shown in Fig. 2, the mold is ready to receive the plastic material, which is filled into the cells *a a*. The top or cap A is then put on and crowded down tightly onto the base B, and the dies or formers on said cap press their counterpart into said plastic material.

At *e*, Fig. 2, an ornament or pressed article is shown as still in the molds, the pins still passing through it.

If the composition out of which the articles are to be made is of such a nature as not to shrink away, in setting or hardening, from the pins, and thus free them sufficiently so as to be readily withdrawn from the mold and the composition, they may be started occasionally to keep them free. But, as a general thing, the pins can be readily withdrawn without injury to the article being molded, and the article itself can be easily taken out of the cell or recess without injury.

If the composition out of which the articles are made be of such a nature as to require baking to harden or set it, this can be readily done, as the molds are made of metal. The articles can be baked in the molds.

What I claim as my invention is—

A mold for molding ornaments in out of a plastic composition or material, which is composed of the three parts or members, A B C, and their appliances, so that in molding such articles the holes by which they are to be fastened to other material shall at the same time be molded in them, substantially as described.

ALANSON C. ESTABROOK.

Witnesses:
GEO. A. BURR,
D. W. BOND.